US012604992B2

(12) United States Patent
Zenoff

(10) Patent No.: US 12,604,992 B2
(45) Date of Patent: *Apr. 21, 2026

(54) TORSO DEVICE

(71) Applicant: ZENOFF PRODUCTS, INC., San Anselmo, CA (US)

(72) Inventor: Andrew Zenoff, Rancho Santa Fe, CA (US)

(73) Assignee: Zenoff Products, Inc., San Anselmo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/641,761

(22) Filed: Apr. 22, 2024

(65) Prior Publication Data

US 2024/0365988 A1 Nov. 7, 2024

Related U.S. Application Data

(63) Continuation of application No. 17/169,385, filed on Feb. 5, 2021, now Pat. No. 11,963,617.

(51) Int. Cl.
| | |
|---|---|
| *A47B 23/00* | (2006.01) |
| *A47C 16/00* | (2006.01) |
| *F16M 13/04* | (2006.01) |

(52) U.S. Cl.
CPC ............ *A47C 16/00* (2013.01); *A47B 23/002* (2013.01); *F16M 13/04* (2013.01)

(58) Field of Classification Search
CPC ....... A47D 13/083; A47C 16/00; A45F 3/005; A47B 23/002
See application file for complete search history.

(56) References Cited

U.S. PATENT DOCUMENTS

| | | | |
|---|---|---|---|
| 5,581,833 | A | 12/1996 | Zenoff |
| 7,587,773 | B2 | 9/2009 | Littlehorn et al. |
| 7,703,159 | B2 | 4/2010 | Parrilla |
| 7,992,502 | B1 | 8/2011 | Davis |
| 8,590,078 | B1 | 11/2013 | Zenoff |
| 8,927,883 | B2 | 1/2015 | Roth |
| 9,138,072 | B1 | 9/2015 | Sanders et al. |

(Continued)

OTHER PUBLICATIONS

International Search Report and Written Opinion of the International Seaching Authority for PCT/US2022/014681, dated Apr. 18, 2022.

*Primary Examiner* — Bradley Duckworth
(74) *Attorney, Agent, or Firm* — Garson & Gutierrez, PC

(57) ABSTRACT

Torso devices comprise a body having a central opening, interposed between an integral body front member and body rear member, for placement of user's torso therein. The front member has a top or table surface, and the front and rear members comprise surface areas for contacting the user's torso. The front and rear members are configured to impose a compression force against the user's torso. Together the front and rear member surface area and the compression force function to maintain a desired placement position of the front member relative to the user when placed in the central opening, e.g., perpendicular to the user's torso or parallel to the floor on which the user is standing, when the user moves from a sitting to a standing position and/or when the user is walking, to thereby provide a readily available table surface for facilitating certain tasks or activities.

20 Claims, 8 Drawing Sheets

(56)          References Cited

U.S. PATENT DOCUMENTS

| | | | |
|---|---|---|---|
| 9,232,863 B1 | 1/2016 | Zenoff | |
| 9,254,031 B1 | 2/2016 | Zenoff | |
| 11,013,346 B2 | 5/2021 | Redford | |
| 11,963,617 B2 * | 4/2024 | Zenoff | A45F 3/005 |
| 2006/0260057 A1 | 11/2006 | Dunn et al. | |
| 2007/0056110 A1 | 3/2007 | Tuoriniemi et al. | |
| 2008/0047987 A1 | 2/2008 | Price | |
| 2013/0145556 A1 | 6/2013 | Kummerfeld et al. | |
| 2018/0242755 A1 | 8/2018 | Redford | |

* cited by examiner

TORSO DEVICE

CROSS-REFERENCE TO RELATED APPLICATIONS

This application is a continuation of, and claims the benefit of priority to, U.S. patent application Ser. No. 17/169,385 filed Feb. 5, 2021, of the same title, the contents of which being incorporated herein by reference in its entirety.

FIELD

Devices as disclosed herein relate to a table or horizontal surface that may be used by a human user and, more specifically, comprise a table or horizontal surface construction that is configured to be worn by a human user to enable the user to make use of the table for facilitating certain activates that may benefit from the use of a table when the user is siting, standing, or walking.

BACKGROUND

The use of tables or horizontal support members or elements are known in the art, and are typically provided in the form of stand-alone objects that may be used by a human user by the user positioning themselves in a manner enabling the user to make use of the table. Typically, a table or horizontal support member is configured to enable a user to make use of the table top surface, e.g., for performing certain activities or tasks, when the user is seated adjacent the table on a chair or the like. Alternatively, also known are standing tables that are configured as a separate object having a height that enables a user to use the top surface of the standing table, e.g., for a certain activity or task, when the user is positioned adjacent the standing table in a standing position.

While such tables and horizontal support members or elements as described above are known in the art, they do not meet today's need associated with the increasingly mobile user of enabling a user to make use of table or horizontal support element or surface while a user is moving, e.g., walking, or moving from location to location and standing. It is no longer convenient for users to move to or position themselves near a conventional table, whether it is a siting table or a standing table, and it is desired that a table or horizontal surface be conveniently available to travel with the user to enable use of the table on the move or wherever the user decides to stop or stand. It is, therefore, desired that devices be developed in a manner that meets such evolving needs of today's user in providing a table or horizontal support surface that is conveniently located for use while a user is on the move or wherever the user may be stopped without the need for the user to position themselves at a particular location, i.e., the location of a table, to carry out or perform certain tasks or activities benefitting from the convenience of having a table surface ever present with the user.

SUMMARY

Torso devices as disclosed herein comprise a body having a central opening interposed between a body front member and a body rear member. The body front member and body rear member are integral one-piece construction along an open end of the front member. The front member includes a closed end. The body front member includes a rear edge and the rear member includes a front edge that is oriented opposed front member rear edge. The front member rear edge and rear member front edge each have a surface area configured to contact an adjacent portion of the torso of a user when placed into the central opening. When the device is in a relaxed state, i.e., when a torso of a user is not positioned in the central opening, the front member closed end is biased inwardly toward the rear member, touching if not immediately adjacent the rear member.

The central opening is configured to accommodate placement of a human torso therein by moving the closed end from a relaxed state away from the rear member to and energized state to thereby form an open passage into the central opening through, wherein the passage accommodate movement of a torso of the user into the central opening. When the torso of the user is placed inside the central opening, the front member and rear member surface areas contact adjacent portions of the torso and also impose a compression force on the torso of the user, wherein the combination of surface area contact and compression force function to maintain a desired placement of the torso device relative to the user's torso when the user moves from a sitting to a standing position and/or is standing and/or walking such that the front member extending substantially perpendicular to the human torso or parallel to a floor on which the user is standing without being supported by the user's hands and/or any other element or member. In an example, the desired placement of the torso device relative to the user is retained, by the combination of the surface area contact and the compression force, when the user moves from a sitting to a standing position, and when the user is walking. In an example, the compression force may be greater than about 0.2 ft·lb, and may be greater than about 0.4 ft·lb. In an example, such desired placement of the torso device relative to the user is achieved without the use of the user's arms or hands, and without the use of any other fastening element or mechanism.

In an example, the body rear member comprises an elongate element that extends upwardly a distance therefrom. The elongate element is configured to provide an increased surface area contact against a back portion of the torso of a user inside of the central opening and provides an increased amount of vertical rigidity to the device to thereby resist downward movement of the front member relative to the torso of the user disposed in the central opening. In an example, the elongate element has a height as measured from a bottom surface of the rear member and a top surface of the elongate element that is at least 1.5 times a thickness of the front member as measured between the front member top surface and a bottom surface of the front member.

In an example, the body first member may have a thickness that is not constant and changes moving from a front edge to the rear edge. In an example, the body front member may have a lip element that projects upwardly a distance from a top surface of the front member and that may be positioned adjacent one or both of the front member front edge or front member rear edge. In an example, the first member and second members are each formed from first and second resilient materials, wherein the first resilient material has a density that is greater than the second resilient material. In an example, the first member comprises a majority of the first resilient material and a minority of the second resilient material. In an example, the first resilient material extends upwardly from a bottom surface of the first member a majority of a thickness of the first member as measured between the bottom surface and a top surface. In an example, the rear member has the same construction as the first member comprising the first and second resilient materials.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF DRAWINGS

Torso devices as disclosed herein will now be described by way of example with reference to the accompanying figures, wherein like reference numerals refer to like elements, and of which.

DESCRIPTION

Torso devices as disclosed herein generally comprise a body having a front member, a rear member, a first side element extending laterally from one side of the rear member towards the front member and separate from the front member, and a second side element extending laterally from another side of the rear member opposite the one side and that is integral with the front member (i.e., the body front and rear members are an integral one-piece construction via the second side element). Configured in this manner, a central opening is formed between the front member and the rear member that is specially sized and configured to enable fitment around the torso or waist of a human user, and to provide a desired degree of compression or squeeze against the torso to as to enable the torso device to maintain a horizontal position while it is worn, e.g., that is parallel to the floor and/or that is perpendicular to the user's torso. The torso device may include a securing or adjustment strap that connects the first side element to an adjacent portion of the front member to enable the user to achieve a further desired degree of fitment of the torso device around the user's torso or waist.

The torso device body front member comprises a rear edge sized having a desired thickness to provide a sufficient surface area that contacts with front and side portions of the user's torso to help prevent downward movement of the torso device front member when worn by a user during use. The torso device body rear member is specially configured having an elongate element extending upwardly a desired distance from the rear member to provide a desired additional degree of surface area for contacting a back portion of the user's torso to help maintain a desired horizontal position of the front member top surface and to help prevent unwanted downward movement of the torso device when worn by a user. In an example, the front member is sized and configured to provide a desired top surface that is immediately available in front of the user to the user when sitting, walking, or standing to enable the user to perform certain tasks or activities that may benefit from the presence of a horizontal surface, e.g., working on a laptop or tablet, playing games, fishing, writing, sewing, eating, reading, or the like, without the need for the user to reposition themselves, e.g., move to a separate table top or other separate horizontal support element, thereby enabling use while standing or moving, e.g., walking.

Figure 1:
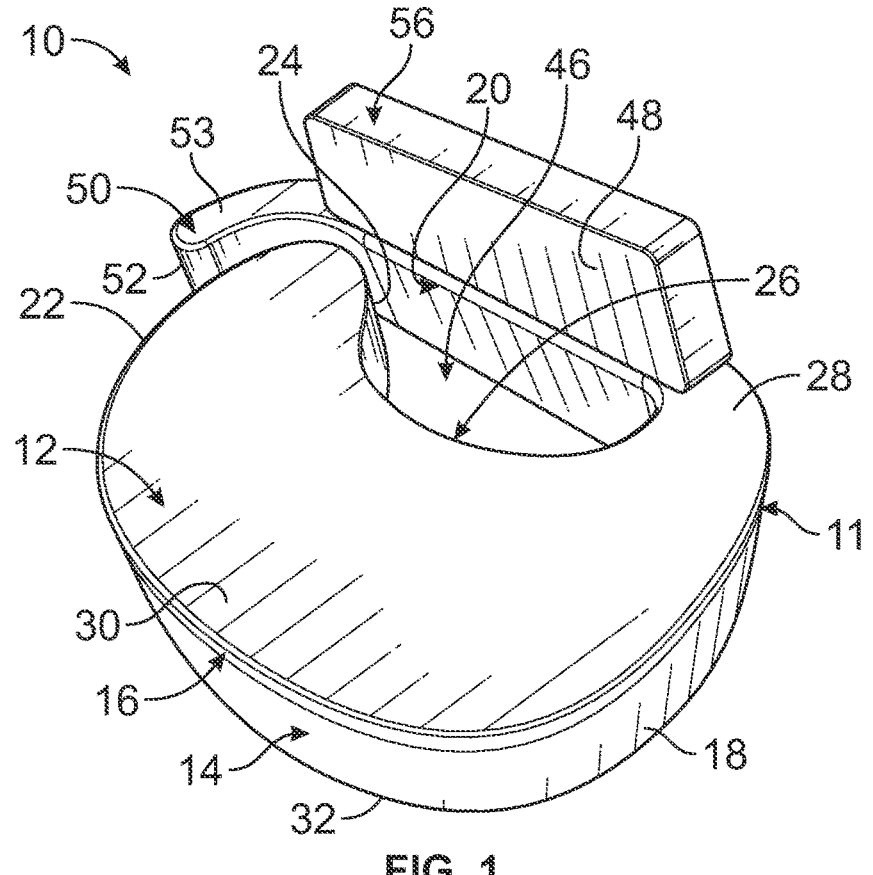
FIG. 1 is a perspective first-side frontal view of an example torso device as disclosed herein.

FIG. 1 illustrates an example torso device 10 as disclosed herein comprising a body 11 having a front member 12 including a vertically-oriented front edge 14 running laterally along a front side of the front member 12. In an example, the front edge 14 is configured having curved surfaces that extend laterally or horizontally in opposed directions from a midpoint 16 of the front edge 14 in a rearward direction along the front member 12. In an example, the front edge 14 extends from the midpoint 16 in a rearward direction, relative to a first side 18 of the device, to a rear member 20 and is integral with the rear member 20. In an example, the front edge 14 extends from the midpoint 16 in a rearward direction, relative to an opposite second side 22 of the device, to an end 24 that is separate and not connected with the rear member 20. The front member front edge 14 is configured in the form of a convex outwardly-shaped curve. While the front member front edge 14 is shown and illustrated having a curved shape, it is to be understood that the front member front edge 14 may have a differently configured shape and be within the scope of torso devices as disclosed herein.

The torso device front member 12 includes a vertically-oriented rear edge 26 that extends laterally or horizontally along a backside of the front member opposite the front edge 14 from the end 24 of the front edge 14 to an open end 28 that is integral with and forms a one-piece connection between the front member 12 and the rear member 20. In an example, the front member rear edge 26 is configured in the form of a concave inwardly-shaped curve for purposes of accommodating fitment around and against a front portion of a human torso or waist. The torso device front member 12 is configured having a top or table surface 30 and an opposed bottom surface 32 each extending generally horizontally parallel with one another along respective top and bottom portions of the front member 12 between the front edge 14 and rear edge 26.

The front member has a thickness, as measured between the top and bottom surfaces 30 and 32, that is configured to provide a desired degree surface area along the rear edge so that when placed into contact with the front and side portions of a user's torso such contacting surface area operates to resist unwanted downward movement of the torso device, e.g., the front member, to thereby maintain the desired placement position of the device on the user with the front member top surface remaining perpendicular to the user's torso (and/or parallel to a floor that the user us standing or walking on) when the user is standing or walking. Also, the front member thickness is configured to provide a desired degree of rigidity to thereby enable use of the front member by the user for performing certain tasks or activities, e.g., working on a laptop, reading, working on a table surface, eating, or the like. Further, as described in greater detail below, the thickness of the front member also functions in conjunction with the rear member (that is integral therewith), the configuration of the front and rear members and the materials used to form the same to provide a desired squeeze or compression force against the torso of a user when worn that combines with the surface area and related contact area with the torso of a user to maintain the desired placement position of the torso support front member perpendicular to the user's torso and or parallel to a floor on what the user is standing or walking. In an example, the front member thickness is greater than about 2 inches, is from about 3 to 8 inches, is from about 4 to 6 inches, and in a preferred embodiment is approximately 5 inches It is to be understood that the exact thickness of the front member may vary from the example dimensions provided depending on the type or rigidity of the material used to form the front member and/or the particular tasks or activities to be performed by the user, and that such variation in thickness is intended to be within the scope of this description.

Figure 6:
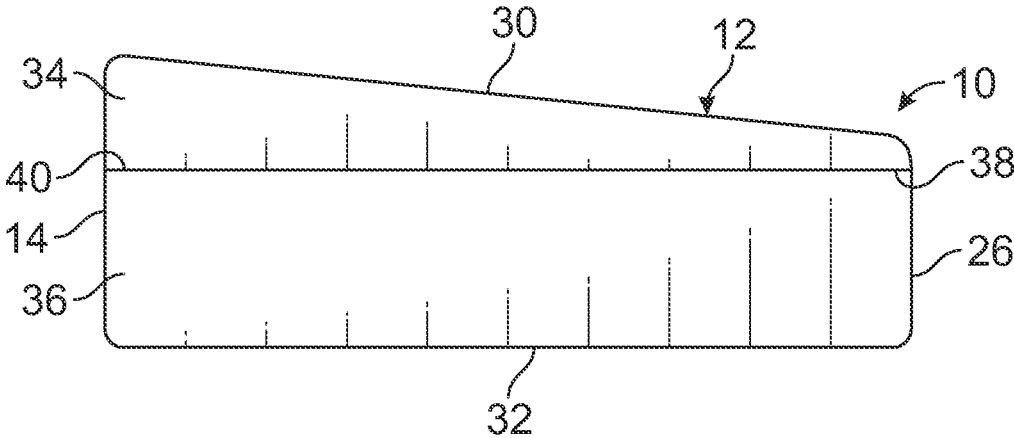
FIG. 6 is a cross-sectional view of a portion of the example torso device as disclosed herein comprising a ramped or inclined top surface.

While a torso device front member 12 having a generally constant thickness has been described, it is to be understood that the front member 12 may be configured differently, e.g., having a nonconstant thickness, to provide a feature and/or functionality called for by or to facilitate accommodating a particular user task or activity. FIG. 6 illustrates a cross-sectional view of an example torso device 10 front member 12 taken along the midpoint 16 (illustrated e.g., in FIG. 1). In this example, the front member 12 is configured having a different or changing thickness (measured between the top and bottom surfaces 30 and 32) that decreases in a gradient manner moving from the front edge 16 to the rear edge 26. The changing thickness may extend along only a partial section of the front member, running a defined distance from one or both sides of the midpoint 16, or may extend along the entirety of the front member 12. In an example, the gradient (or gradual change in thickness) may be greater than about ¼ inch, from about ½ to 5 inches, from about ¾ to 4 inches, and in a preferred example is between about 1 to 2 inches. In such example, the use of a front member having an inwardly-declining top surface may be desired for the purpose of ensuring that articles or objects placed on the top surface 30 do not easily move off of the device, e.g., roll off the front edge 14, and instead are biased to move inwardly towards the rear edge 26 and to the user. In such an embodiment, the front member rear edge would still maintain the desired surface area described above for retaining the placement position of the front member on the user. Also, while an example embodiment of a nonconstant or changing thickness front member has been described and illustrated, it is to be understood that other examples, e.g., examples having a stepped or nongradient change in thickness, are intended to be within the scope of torso devices as disclosed herein.

As discussed in greater detail below, the torso device front member 12 may be formed from a single layer of material, or may be formed from two or more layers of material. FIG. 6 illustrates an example where the front member 14 is formed from two layers of material, namely a top material layer 34 and a bottom material layer 36. In this example, the above-described gradient thickness feature may be achieved by using the top material layer 34 configured having a gradient thickness top surface 30 and a horizontal bottom surface 38, whereby the top layer bottom surface 38 is joined to an opposed horizontal top surface 40 of the bottom material layer 36 that has a uniform thickness. While a particular example of a torso device having a nonconstant thickness has been disclosed and illustrated, it is to be understood that this is but one example configuration provided for reference and that other configurations may be used with torso devices as disclosed herein. For example, it may be desired for certain tasks and/or activities that the torso device be configured having a gradient thickness that decrease (when measured along a midpoint of the front member) running from the rear edge 26 to the front edge 14 (i.e., in an opposite direction than illustrated in FIG. 6). Accordingly, it is to be understood that all such configurations of torso devices having a front member nonconstant thickness are intended to be within the scope of torso devices as disclosed herein.

Figure 7:
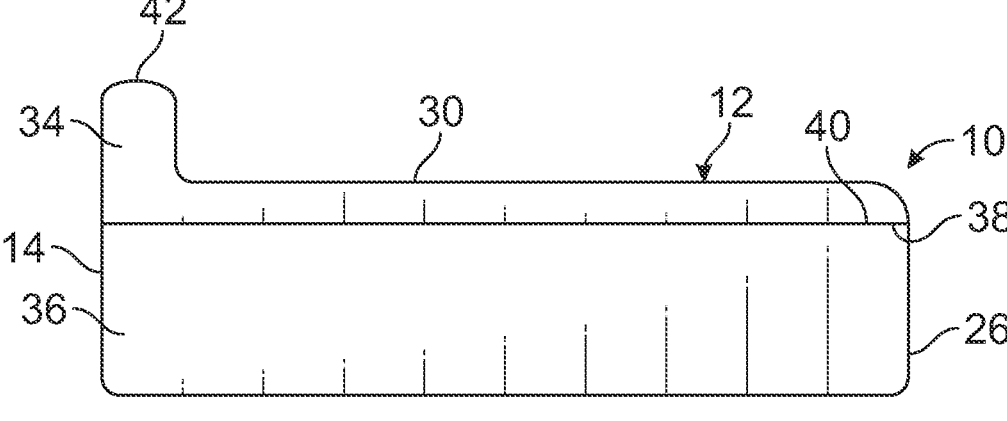
FIG. 7 is a cross-sectional view of a portion of the example torso device as disclosed herein comprising an top surface edge lip.

In another example, it may be desired that the torso device 10 be configured having a front member 12 top surface configured having a nonconstant thickness that is not in gradient form. FIG. 7 illustrates a cross-sectional view of an example torso device 10 front member 12 taken along the midpoint 16 (illustrated e.g., in FIG. 1). In this example, the front member 12 is configured having a lip element 42 that projects outwardly a distance from the top surface 30, and that extends from or adjacent the front edge 14 a distance towards the rear edge 26. The lip element 42 may extend along only a partial section of the front member, running a defined distance from one or both sides of the midpoint 16, or may extend along the entirety of the front member. The lip element 42 may also be configured differently, e.g., having a rounded, flat, or pointed top, depending on the particular user task and/or activity it is facilitating. In an example, the lip element 42 may extend a height from the top surface 30 of greater than about ¼ inch, from about ½ to 5 inches, from about ¾ to 4 inches, and in a preferred example is between about 1 to 2 inches. In such example, the use of a front member top surface lip element 42 may be desired for the purpose of ensuring that articles or objects placed on the top surface 30 do not easily move off of the torso device during use, and instead stay placed on the top surface 30 between the lip element 42 and the user's torso in contact against the rear edge 26. As discussed in greater detail below, the device front member 12 may be formed from a single layer of material, or may be formed from two or more layers of material.

Like the construction of FIG. 6, FIG. 7 illustrates an example where the front member 14 is formed from two layers of material; namely a top material layer 34, and a bottom material layer 36. In this example, the above-described lip element 42 may be achieved by using the top layer 34 configured having such lip element 42 top surface 30 and a horizontal bottom surface 38, whereby the top layer bottom surface 38 is joined to an opposed planar horizontal top surface 40 of the bottom layer 36 having a constant thickness. While a particular example of a torso device having a lip element 42 has been disclosed and illustrated, it is to be understood that this is but one example configuration provided for reference and that other configurations may be used with torso devices as disclosed herein. For example, it may be desired for certain user tasks and/or activities that the torso device have a lip element that is located extending upwardly from or adjacent the front member rear edge 26, e.g., to provide a gradual upward transition from the front member top surface to the front portion of a user's waist, which may operate to provide a desired increased surface area of contact between the front member rear edge and the user's torso to better retain the placement position of the torso device relative to the user. Alternatively, it may be desired that the torso device be configured having lip elements located at or adjacent each of the front member front edge 14 and rear edge 26. These are but a few examples of alternative configurations of torso devices as disclosed herein comprising one or more lip elements. Accordingly, it is to be understood that all such configurations of torso devices having one or more lip elements extending from the front member are intended to be within the scope of torso devices as disclosed herein.

Further, while not illustrated, torso devices as disclosed herein may be configured comprising a combination of both a front member nonconstant, e.g., gradient, thickness (e.g., as illustrated in FIG. 6) and a front member lip element (e.g., as illustrated in FIG. 7). Thus, it is to be understood that all such combinations of features are intended to be within the scope of torso devices as disclosed herein.

With reference to FIG. 1, the front member 12 has a width as measured horizontally between the front edge 14 and rear edge 26 that varies depending on the measurement location. As illustrated, the front member width increases from a minimum moving from the end 24 to a maximum at the midpoint 16, and then decreases in width moving from the midpoint 16 to the open end 28 that is integral with the rear member. In an example, the front member width at the midpoint 16 may be greater than about 3 inches, be from about 4 to 16 inches, be from about 6 to 12 inches, and in a preferred embodiment is approximately 9 inches. It is to be understood that the exact width of the front member at the midpoint 16 may vary from the example dimensions provided depending on the particular user tasks and/or activities and that such variation in dimension is intended to be within the scope of this description. Also, the width of the front member may vary depending on the desired amount of squeeze or compression to be placed onto the torso of the user during use so as to retain the placement position of the torso support on the user.

The front member 12 has a maximum length as measured horizontally along the top surface 30 perpendicular to the midpoint 16. Together, the length and the width of the front member operate to both provide a desired squeeze or compression against the torso of a user to retain the placement position of the torso device on the user, and accommodate user tasks and/or activities that may be performed on the top surface 30. In an example, the front member has a maximum length as measured between the front edge 14 and rear edge 26 of at least 14 inches, from about 16 to 26 inches, from about 18 to 24 inches, and in preferred embodiment has a length of approximately 20 inches. It is to be understood that the length dimensions of the front member provided above are for purposes of reference and that torso devices as disclosed herein may be sized differently depending on the desired amount of inwardly-directed squeeze or compression placed on the user's torso and/or the particular user tasks and/or activities and that all such differently-sized torso devices are intended to be within the scope of torso devices as disclosed herein.

In an example, the torso device front member top surface 30 may comprise one or more optional surface features that may be integral therewith, i.e., formed as part of the top surface, and that may be configured, sized, and/or located to facilitate a user's use of the torso device for performing particular tasks and/or activities. For example, such surface feature and be in the form of one or more projections configured to assist with holding or supporting a laptop computer or tablet. Alternatively, the top surface may be configured to accommodate contact, connection, or attachment with a separate element that may serve to facilitate use of a particular user device or element. Thus, it is to be understood that all such configurations of surface features or other elements with the front member top surface regardless of shape, size, and/or placement position are intended to be within the scope of torso devices as disclosed herein.

The torso device 10 body rear member 20 extends laterally or horizontally from its integral connection with the front member open end 28, i.e., forming a one-piece construction, and across the opposed front member rear edge 26 thereby forming a user opening 46 or open cavity. The user opening 46 is formed or defined between the front member rear edge 26, the front member open end 28, and a vertically-oriented front edge 48 of the rear member. The user opening 46 is accessed via an open passage formed between the front member end 24 and the rear member 20. In an example, the rear member front edge 48 is flat or planar in configuration for the purpose of contacting a substantial width of a back portion of a user's torso when the user is position with their waist or torso in the opening 46. In an example, the rear member front edge 48 (as measured along the planar portion) extends horizontally a length along the user opening 44 of greater than about 10 inches, from about 12 to 18 inches, from about 13 to 16 inches, and in a preferred embodiment approximately 14 inches. It is to be understood that the exact horizontal length of the rear member front edge 48 may vary from the example dimensions provided depending on the desired contact area with the user, and that such variation in dimension is intended to be within the scope of torso devices as disclosed herein.

Figure 2:
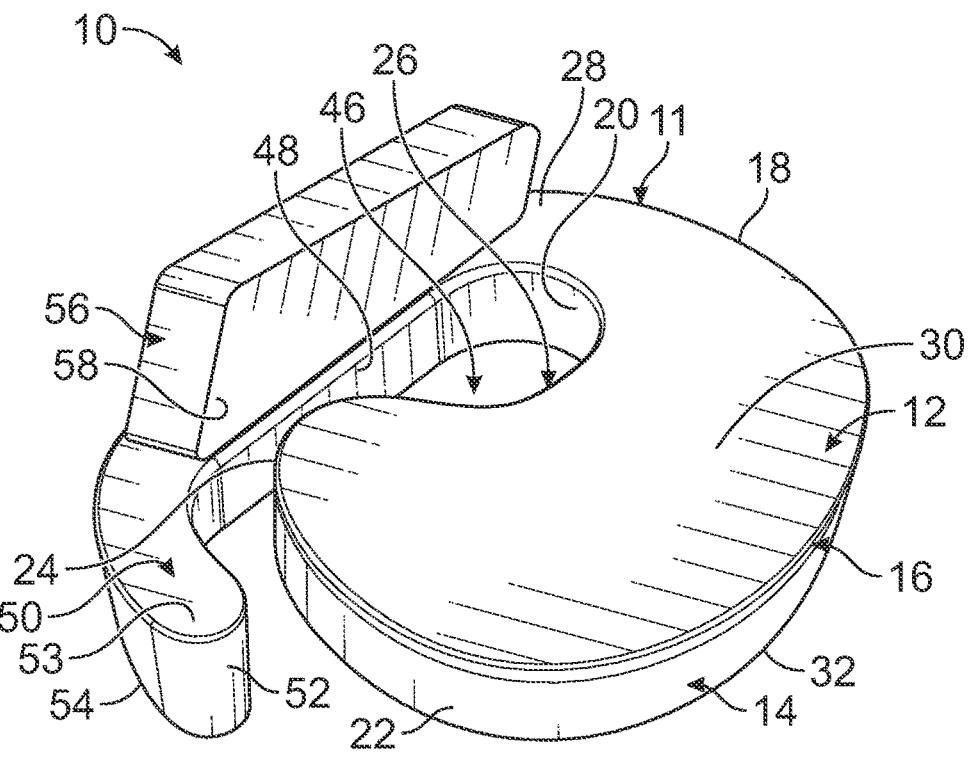
FIG. 2 is a perspective second-side frontal view of the example torso device of FIG. 1.
Figure 3:
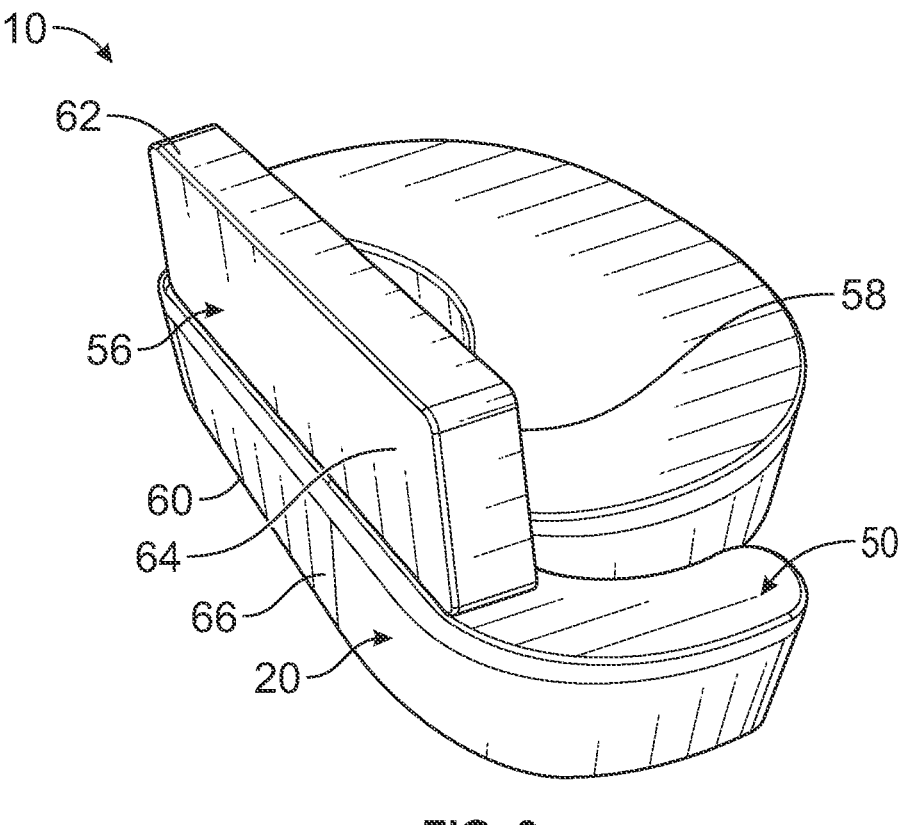
FIG. 3 is a perspective first-side rear view of the example torso device of FIG. 1.

FIGS. 2 and 3 show the example torso device 10 and the feature of the front member front edge end 24 and its placement position relative to the rear member 20. As can illustrated, the rear member 20 comprises a side element 50 located on an end of the rear member opposite the front member open end 28. The side element 50 is integral with and extends laterally or horizontally a distance from the rear member front edge 48 to an end 52. The rear member side element 50 is configured having a curved shape that is biased inwardly towards the adjacent and opposed unattached front member front edge 14 adjacent the end 24 outside surface. In an example, the side element 50 has a thickness as measured between a top surface 53 and a bottom surface 54 that is approximately the same as the thickness of the adjacent and opposed portion of the front member front edge 14 to thereby provide a continuity of transition therebetween when the user is wearing the device.

Features of torso devices as disclosed herein is the integral construction of the front and rear members 12 and 20 via the open end 28, and the configuration of opposed surfaces of the front and rear member forming the opening 46 to both impose a desired squeeze or compression force on a user's torso once placed in the opening 46, and to provide a desired amount of surface area that contacts the user's torso that in combination operate to maintain the desired placement position of the torso device on the user, i.e., with the front member remaining substantially perpendicular to the user's torso, while the user is moving, e.g., moving from a sitting position to a standing position or walking, or standing without additional support from the user's hands or other element or member to maintain such desired placement position. In an example, the device makes contact with greater than about 75 percent, and greater than about 85 percent of a user's torso when placed within the opening to thereby take advantage of the contact surface area with and squeeze or compression force against a user's torso to thereby maintain the desired torso device placement position. With reference to FIGS. 1 and 2, when in a relaxed state, the torso device front member rear end 24 is biased inwardly towards the rear member edge 26 so that it touches or is spaced only a small distance away, e.g., 0.5 to 1 inches, from the rear member front edge 48 and is positioned inwardly of the rear member side element 50 such that in a relaxed state the side element 50 extends around the front member front surface leading away from the end 24. Together with the inwardly biased condition of the front member end 24 towards the rear member 20, the placement position of the front member end 24 inwardly of the rear member side element 50, and the opposed curved surface of the front member rear edge 26 and the rear member back surface 48, such features operate to both provide a desired degree of squeeze or compression on the torso of a user once positioned inside of the opening 46 along with a desired degree of surface area contact between the user's torso and the device to retain the placement position of the device on the torso (with the front member perpendicular to the torso and/or parallel to the floor that the user is standing or walking on) of the user while the user is moving, e.g., walking, or standing. A feature of the torso device as disclose herein is that such desired position of the torso device once worn by the user is retained relative to the user without the user needing to use their arms or hands to maintain or adjust the position of the torso device.

In an example, the torso device configured in such manner was measured to determine the force associated with moving the front member end 24 and rear member 20 away from one another from the relaxed state. The measurement was performed by maintaining placement of the front member in a fixed position and moving the rear member away from the front member from the relaxed state. A pull force gauge was attached to the rear member 20 at the point where the side element 50 extends from the rear member rear edge 48, and the force measured on the pull force gauge was measured as the rear member was moved from a relaxed position. As the rear member 20 was pulled away from the front member 12 the following forces were measured as a function of the angle of the rear member relative to the fixed front member (i.e., relative to an axis running along the length of the fixed front member): approximately 0.2 foot pounds (ft·lb) at approximately 1 to 4 degrees, approximately 0.3 ft·lb at approximately 10 to 15 degrees, approximately 0.4 ft·lb at approximately 20 to 30 degrees; approximately 0.5 ft·lb at approximately 40 to 50 degrees, approximately 0.6 ft·lb at approximately 51 to 60 degrees; approximately 0.7 ft·lb at 62 to 74 degrees; approximately 0.8 ft·lb at approximately 75 to 80 degrees; approximately 0.9 ft·lb at approximately 81 to 84 degrees, approximately 1.0 ft·lb at approximately 85 to 87 degrees, and approximately 1.1 ft·lb at approximately 88 to 90 degrees. Thus, based on this force measurement information, a threshold amount of force needed to move the front member end 24 from its relaxed state a distance of approximately 2 to 4 inches away from the rear member front edge 48 is at least 0.2 ft·lb, which distance is not enough to enable user access into the opening 46. A threshold amount of force needed to move the front member end 24 from its relaxed state a distance of approximately 12 inches away from the rear member front edge 48 is at least 0.4 ft·lb, which may be a sufficient distance to enable user access into the opening. Based on this measurement information, the torso device imposes a compression force on the torso of a user of at least 0.2 ft·lb, from about 0.3 to 0.8 ft·lb, and from about 0.4 to 0.7 ft·lb when the user is positioned within the opening 46. While such force measurements have been provided for an example torso device (comprising the preferred measurements and formed from the preferred resilient materials described herein) it is to be understood that torso devices may produce different force measurements if sized differently and/or if formed from different types of resilient materials, and that such different force measurements and related compression forces are intended to be within the scope of torso devices as disclosed herein.

Figure 5:
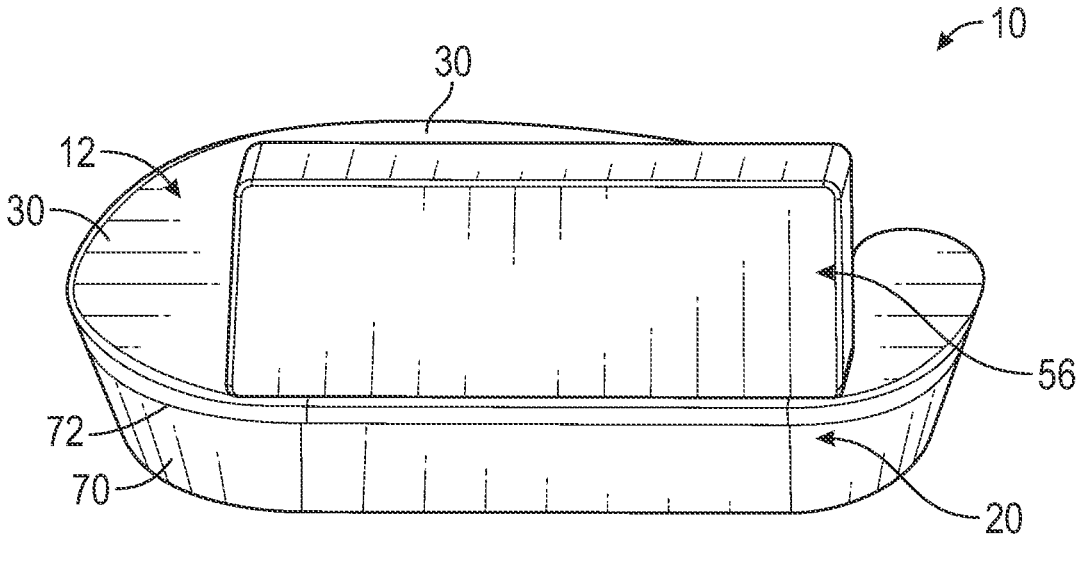
FIG. 5 is a perspective rear view of the example torso device of FIG. 1.

FIGS. 3 and 5 show the example torso device 10 and the rear member 20 comprising an elongate element 56. The elongate element 56 extends laterally or horizontally along the planar portion of the rear member front edge 48 (shown in FIGS. 1 and 2), e.g., greater than about 10 inches, from about 12 to 18 inches, from about 13 to 16 inches, and in a preferred embodiment approximately 14 inches. The elongate element 56 extends upwardly a distance from the rear member front edge 48. Together with the rear member front edge 48, the elongate support element 56 is configured to provide a desired degree of surface area for contacting the rear torso of a user to act in conjunction with surface area of the front member rear edge 26 to maintain the position of the torso device on the user when the user is moving, e.g., from a sitting position to a standing position, or walking, or standing. Additionally, the elongate element and its increased area of contact upwardly on a user's torso operates to resist the front member from dipping down, and again maintaining the desired perpendicular orientation of the front member relative the torso of a user. In an example, the elongate element 56 includes a vertically-oriented front edge 58 (best shown in FIGS. 1 and 2) that is coterminous with the rear member front edge 48 to thereby provide a uniform vertical surface along the rear member 20, thereby enabling the rear member and elongate element to function in the manner noted above. In an alternative embodiment, it may be desired that the elongate element 56 be configured having a front edge 58 positioned inwardly or outwardly relative to the remaining portion of the rear member front edge 48 to thereby adjust the degree of function provided. In an example, the total vertical height of the rear member 20 including the elongate support element 56 (as measured between a bottom surface 60 of the rear member and a top surface 62 of the elongate support element 56) is greater than about 6 inches, is from about 7 to 14 inches, is from about 8 to 13, and in a preferred embodiment is approximately 9 inches It is to be understood that the exact height may vary from the example dimensions provided depending on the particular thickness of the front and/or back members and/or depending on the materials used to form the torso device, and that all such variations in dimension are intended to be within the scope of torso devices as disclosed herein. For example, in certain embodiment, it may be desired that the rear member and elongate support element have a combined height (as measured above) that is at least 1½ times, and that may be at least 2 times, the thickness of the front member. In other certain embodiments, the rear member and elongate support element may have a combined height (as measured above) of 12 inches or more as called for to provide a desired improved degree of function as described above.

Figure 4:
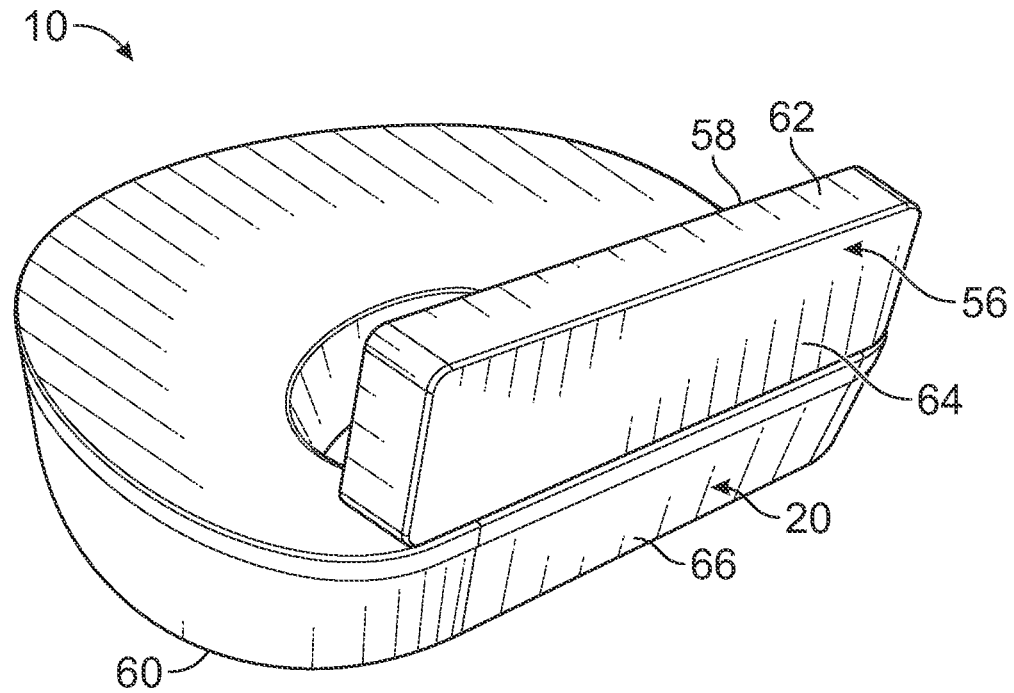
FIG. 4 is a perspective second side rear view of the example torso device of FIG. 1.

Referring to FIGS. 3 and 4, in an example, the elongate element 56 has a width as measured between the front edge 58 and a vertically-oriented rear edge 64 that is coterminous with the rear member 20 (as measured between the rear member front edge 48 and a rear member rear edge 66). In an example, the rear member side element 50 has a width that is the same as the rear member 20. In an example the elongate element 56 has a width of at least ½ inch, from about ¾ to 4 inches, from about 1 to 3 inches, and in a preferred embodiment has a width of approximately 2 inches. It is to be understood that the exact width may vary from the example dimensions provided depending on such factors as the dimensions and configuration of other elements or features and/or the particular materials of construction, and that all such variation in dimensions is intended to be within the scope of torso devices as disclosed herein.

Torso devices as disclosed herein may be made from different materials that are capable of providing a desired balance of surface area, friction interface, rigidity, compression force and/or comfort to the user when being worn, and/or providing a desired functionality for accommodating user tasks and/or activities. In an example, it is desired that the torso device be formed from a resilient material capable of being elastically deformed such as foam, sponge, and the like. Additionally, such materials are desired for the purpose of providing a relatively high-friction interface with the torso of a user when deformed there against by compression force to thereby promote (along with the features of surface area and compression force) retaining the torso device in the desired position during use. In an example, the torso device is formed from a foam material that has characteristics capable of providing a balanced degree of friction interface, rigidity, and comfort to the user when being used. The type and/or density of the foam that is used can and will vary depending on the particular construction of the torso device. For example, when the torso device is formed from a single type of foam, then the foam material that is selected must necessarily represent a compromise between providing a degree of friction interface and rigidity while also providing a degree of comfort to the user. In such case where the torso device is formed from a single type of foam, suitable foams include those having a 30/36 ILD firmness rating and a 2.0 density rating. However, it is to be understood that for such single type of foam construction the torso device can be made of any other foam such as closed-cell foams, and the like. While torso devices have been described as being formed from certain types of resilient materials, it is to be understood that torso devices as disclosed herein may comprise an inflatable construction wherein part or all of the construction is filled with air and is configured to provide the function of surface area, squeeze or compression force, and rigidity as disclosed above.

In an example, the torso device may be constructed comprising two or more different types of foam. With reference to FIG. 5, the torso device 10 is formed using at least two different types of foam materials. The torso device 10 comprises a first foam material 70 that extends from the bottom surfaces of the front and rear members 12 and 20 to a second foam material 72 that extends from the first foam material 70 to the first member top surface 30. In an example, the first foam material 70 has a density that is different from that of the second foam material 72. In a preferred embodiment, the first foam material 70 has a density that is greater than that of the second foam material 72 to thereby provide a desired increased degree of stiffness, rigidity, and friction interface. The second foam 72 forming the top surface 30 provides a desired degree of softness and comfort for accommodating certain user tasks and/or activities. Suitable foams useful for forming the first foam material 70 have a Shore A hardness of from about 30 to 100, and have a density of from about 10 to 30 kg/m³. In a preferred example, the first foam material 70 has a Shore A hardness of approximately 80, and a density of approximately 20 kg/m³. Suitable foams useful for forming the second foam material 72 have a Shore A hardness of from about 15 to 50, and have a density of from about 5 to 25 kg/m³. In a preferred example, the second foam material has a Shore A hardness of approximately 35, and a density of approximately 18 kg/m³.

In an example, the first foam material 70 forms 50 percent or more of the thickness of the front and rear members (not including the elongate element), and the second foam material 72 forms 50 percent or less of the thickness (not including the elongate element). In an example, the first foam material forms about 55 to 95 percent of the total thickness, from about 65 to 90 of the total thickness, and in a preferred embodiment approximately 80 percent of the total thickness with the second foam forming the remaining thickness (not including the elongate element). Generally, it is desired that the torso device comprises a greater amount of the higher-density foam material for providing greater stiffness and rigidity, while also providing a friction interface, all useful for ensuring that the desired positioning of the device is maintained relative to the user during use. It is to be understood that the exact amounts or proportions of the first and second foam materials 70 and 72 that are used to form torso devices as disclosed herein will vary depending on the particular different properties of the two different foam materials that are used, and that such differences are intended to be within the scope of this description.

In such an example as described above, where the torso device is formed from the two different foam materials 70 and 72, the elongate element 56 may be formed from one of the two different foam materials 70 and 72, or may be formed from a third foam material having a density that is different from the density of both the first and second foam materials. For example, the elongate element 56 may be formed from a foam material having a density that is greater than that of the first foam material 70, or the elongate material may be formed from a foam material having a density that is somewhere between the densities of the first and second foam materials, or the elongate material may be formed from a foam material having a density that is less than that of the second foam material 72. In an example, where the first and second foam materials have the respective specific density properties described above, the elongate support material 56 is formed from the second foam material 72 having the relative lessor density for the purpose of providing an improved degree of comfort and conformability to the user. Alternatively, the elongate support element 56 may be formed from a third foam material having a density that is greater than the second foam material and less than the first foam material to thereby provide an intermediate degree of firmness to still provide improved lumbar support while also providing some degree of softness and comfort.

While a particular example of a torso device made from two or more different foam materials has been disclosed, it is to be understood that torso devices as disclosed herein may be formed from different types of foams than those disclosed above and/or be made using different proportions of different types of foam materials than those disclosed above, e.g., torso devices may have an inflatable construction as noted above, to achieve the same or similar purposes and/or function as described, and all such embodiments of torso devices so formed and constructed are intended to be within the scope of torso devices as disclosed herein. The different foam materials used to form torso devices as disclosed herein may be formed and combined by conventional practice, e.g., by molding formation and gluing assembly processes and the like.

Figures 8, 9:
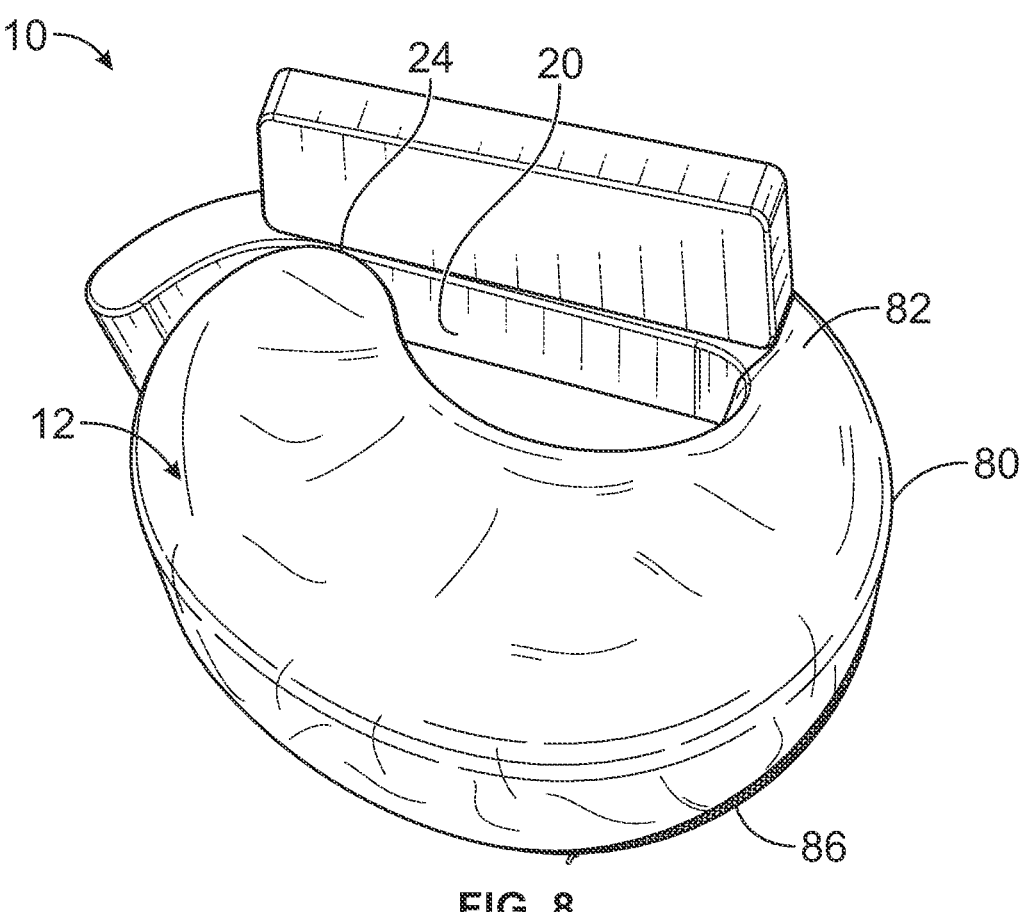
FIG. 8 is a perspective first-side frontal view of the example torso device of FIG. 1 comprising an inner cover.
FIG. 9 is a perspective first-side frontal view of the example torso device of FIG. 1 comprising an outside cover.

FIG. 8 shows an example torso device 10 as disclosed herein comprising an optional inside cover 80 disposed over at least a partial portion of the torso device. In an example, the inside cover 80 is formed from a moisture resistant or moisture proof material for the purpose of protecting the underlying foam material. Suitable materials useful for forming the inside cover 80 include plastic and other types of polymeric film materials that have moisture blocking or moisture barrier properties and that may or may not be transparent. In an example, the inside cover 80 is configured to fit over the front member 12, and in a preferred embodiment the inside cover fits over/surrounds the entirety of the front member 12. In an example, the inside cover 80 is a removable element that is provided in the form of a sleeve having an open end 82 and a closed end 84, wherein the open end 82 is configured to fit around the front member front edge open end 28 (shown in FIG. 1), and the closed end 84 is configured to fit around the front member closed end 24 (shown in FIG. 1).

The inside cover 80 includes a zippered connection 86 that extends from the inside cover open end 82 a partial length along a bottom portion of the inside cover 80. The inside cover zippered connection 86 is unzipped into two zipper sections prior to the inside cover being installed over the front member to enable fitment of the front member end 28 and larger portion of the front member 12, e.g., adjacent the midpoint 16, into the inside cover 80. Once the inside cover 80 is installed over the front member, such that the inside cover open end 82 is positioned around the front member close end 28, the two zipper sections are engaged and zipped together to cause the inside cover 80 to surround and protect the torso device front member 12. Configured in this matter the inside cover is removable for purposes of cleaning or replacing as needed. In an example, the inside cover 80 is made by conventional process such as by molding and the like. While a particular configuration of the inside cover has been illustrated and disclosed, is understood that inside covers may be configured differently for the same or similar purpose of protecting the underlying torso device foam material from moisture, and that all such different inside cover configurations are intended to be included within this disclosure. Additionally, while an inside cover has been disclosed that functions to protect the torso device front member 12 from moisture, it is to be understood that the inside cover or the use of an additional inside cover may be configured or made for the purpose of also providing moisture protection to the rear member 20, and that such is intended to be within the scope of this disclosure.

FIG. 9 shows an example torso device 10 as disclosed herein comprising an outside cover 90 disposed thereover. In an example, an outside cover 90 may be formed from any material suitable for providing an outside surface to the torso device to provide a desired friction interface for the surface area of the torso device that contacts the user's torso during use. Suitable materials useful for forming the outside cover 90 include fabric materials, cloth materials, plastic materials, polymeric materials, and combinations thereof. In an example, the outside cover 90 is formed from a fabric material. In an example, the outside cover 90 is configured to fit over the torso member and, in a preferred embodiment, fits over the entire torso device, i.e., both the front member 12 and rear member 20 (e.g., shown in FIG. 1.) In such preferred embodiment, the outside cover functions to not only form the torso device outer surface, but also functions to provide attachment/fastening points and mechanisms as better described below. In an example, the outside cover 90 is configured having a top section that is tailored to fit over the top surfaces and the front and rear edges of both the front member and the back member including the elongate support element, and has a bottom surface that is configured to fit over the bottom surfaces of the front and back members.

A zippered connection 92 is provided that runs along an edge of the front member (at the intersection of the front edge 14 and bottom surface 32 with reference to FIG. 1) and an edge of the back member (at the intersection of the rear edge 66 and bottom surface 60 with reference to FIG. 4), and is used to connect the top and bottom sections together. The outside cover 90 includes a first closed end 94 that is configured to enclose the front member front edge end 24 (e.g., shown in FIG. 1) therein, and a second closed end 96 that is configured to enclose rear member side element 50 (e.g., shown in FIG. 1) therein. The zippered connection 92 extends between the first and second closed ends 94 and 96, and is unzipped into two zipper sections prior to installation of the outside cover over the remaining portions of the front and back members to thereby encapsulate the torso device therein. In an example, the outside cover 90 is made by conventional process depending on the type of material that is used, e.g., when formed from a fabric material the outside cover is made by sewing process. While a particular configuration of the outside cover has been illustrated and disclosed, is understood that outside covers may be configured differently for the same or similar purposes described above, and that all such different outside cover configurations are intended to be included within this disclosure.

Figure 10:
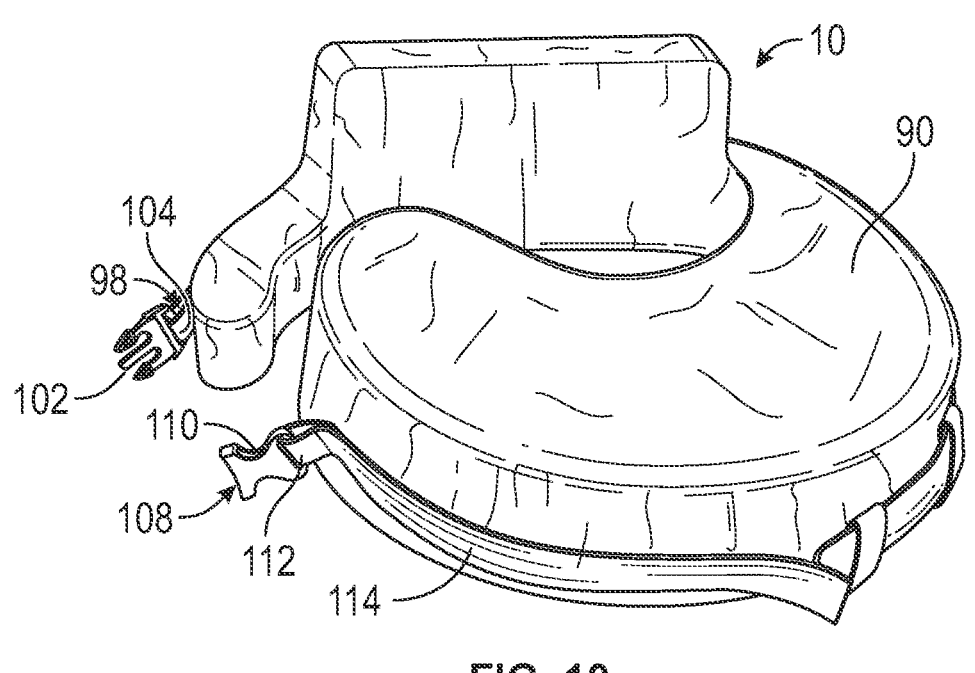
FIG. 10 is a perspective second-side frontal view of the example torso device of FIG. 9.
Figure 11:
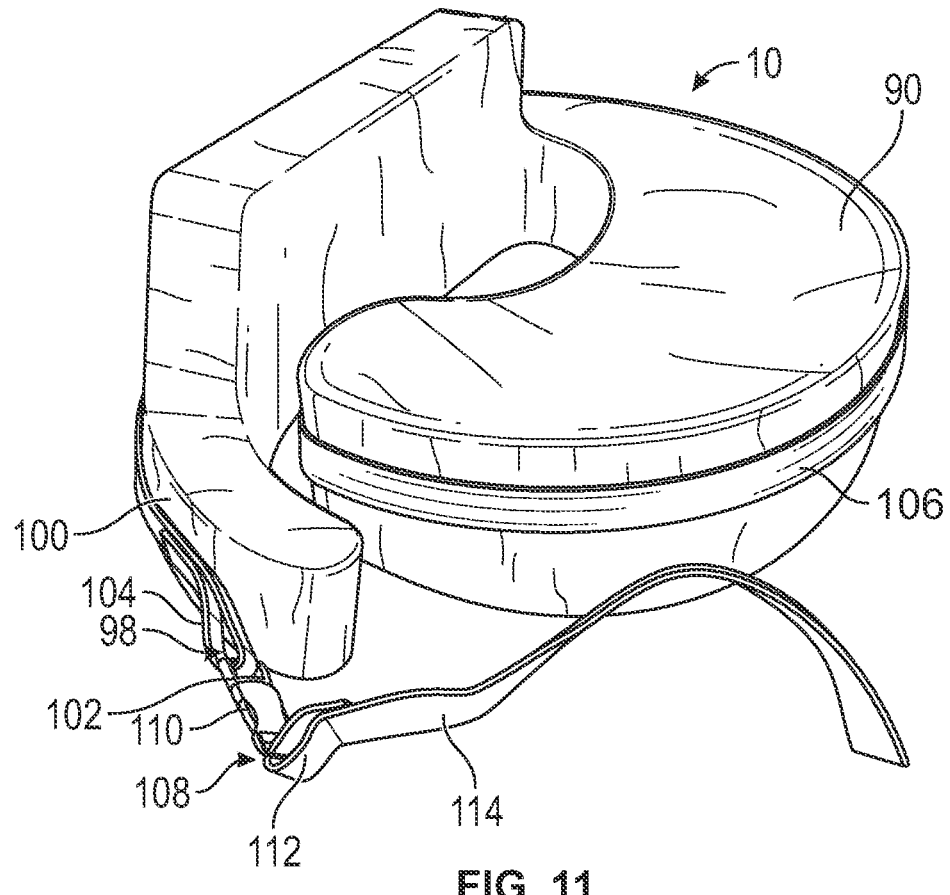
FIG. 11 is a perspective second-side frontal view of the example torso device of FIG. 9.

FIGS. 9 to 11 show the torso device 10 as disclosed herein with the outside cover 90 installed. The outside cover 90 is configured to include a first attachment element 98 that is used for the purpose of adding a further mechanism, e.g., in addition to that provided by the surface area and compression force of the torso device, for fastening the torso device 10 around the waist of a user to further promote use of the torso device in the manner described above. The first attachment element 98 is connected with a side edge surface 100 of the outside cover 90 that is disposed over the rear member side element 50 (e.g., shown in FIG. 1). In an example, the first attachment element 99 is provided in the form of a male snap connection member 102 that is attached at one end by a fabric loop 104, wherein the fabric loop is attached at an opposite end to the outside cover 90. In an example, the fabric loop 104 is sewn to the outside cover. The outside cover 90 is configured to include an attachment point 106 that extends along a partial length of the front member front edge and is positioned starting a distance away from the front edge end 24 (e.g., shown in FIG. 1). A second attachment element 108 is provided in the form of a female snap connection member 110 that is attached at one end by a fabric loop 112, wherein the fabric loop comprises a length of fabric belting 114 attached thereto. In an example, the fabric belting 114 is configured having a desired length to enable attachment with the attachment point 106 to provide a further fastening attachment of the torso device 10 around a user's torso by engagement of the male and female snap connection members 102 and 110. In an example, the attachment point 106 comprises a Velcro material configured to form a releasable attachment with a Velcro material of the fabric belting 114.

Configured in this manner, the torso device may be fitted to a user by the user first urging the inwardly biased front member front edge end 24 away from the rear member side element 50 so that they can insert their torso or waist within the opening 46 or cavity between the front and rear members 12 and 20. Once the user's waist is in the opening 46 the torso device elastically returns to its position biased against the user as described earlier, e.g., imposing a compression force against the user sufficient to maintain the position of the torso device front member perpendicular to the user's torso when walking or standing. Optionally, the torso device may be further fastened to the user by connecting the male and female snap members 102 and 110 and together. The male and female snap members 102 and 110 may be connected before the fabric belting 114 is attached with the attachment point 106 in the event that an attachment point position has not already been established, in which case the user then attaches the fabric belting 114 to the attachment point 106 at a location where a desired secured fit is achieved. Alternatively, in the event that the user has worn the torso device before, the fabric belting 114 may already be attached to the attachment point 106 at a location where a desired secured fit exists, in which case the user only need join the male and female snap connection members 102 and 110 together to achieve further fastening of the torso device 10. Accordingly, a feature of torso devices as disclosed herein is the ability to further fasten the torso device around the user to further ensure that the position of the torso device does not move during user movement, e.g., moving from a sitting position to a standing position or walking, or standing during use. While particular types of connection members and attachment of the connection members with the outside cover has been disclosed it is to be understood that other attachment mechanisms that function to enable the user to wear the torso device and form an optional further fastened attachment of the torso device around the user's waist are intended to be within the scope of the torso device as disclosed herein.

FIG. 9 shows use of an optional attachment element 116 with the torso device outside cover 90. In an example, the optional attachment element 116 may be configured as needed to promote or add a degree of functionality to the torso device 10 for a user. In an example, the attachment element 116 may be configured in the form of a bag or a pocket or the like for accommodating fitment of an object therein. In an example, the attachment element 116 may be attached along a portion of the front member front edge 14 (e.g., shown in FIG. 1) at a location convenient for access and by the user. In an example, the attachment element 116 is a bag that is formed from a material such as the material used to form the outside cover 90. The attachment element 116 may be attached to the outside cover by conventional means such as by sewed connection, button connection, Velcro connection, and the like to provide a permanent or releasable connection with the outside cover. While an example optional attachment element 116 has been specifically described and illustrated having a particular configuration, it is to be understood that attachment elements capable of performing the same or similar functions may be configured differently and that all such different configurations of the attachment element as used with the outside cover are intended to be within the scope of torso devices as disclosed herein.

Figure 12:
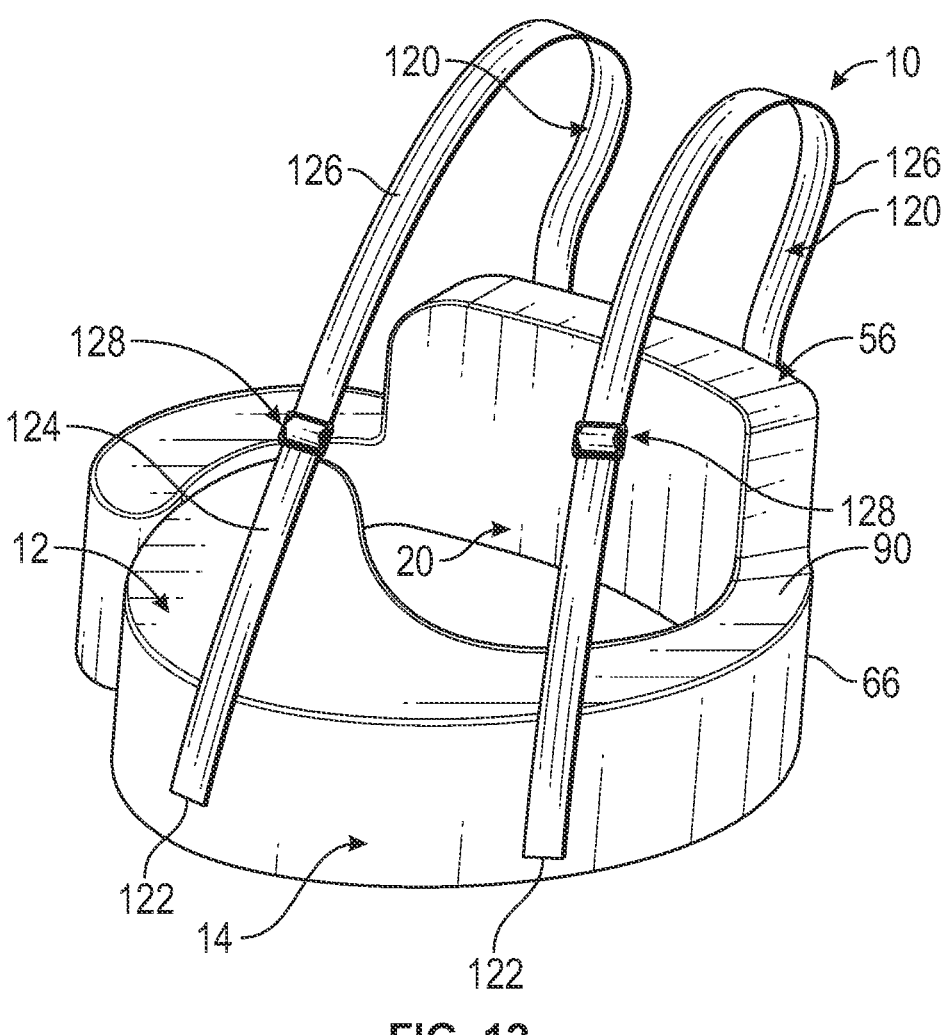
FIG. 12 is a schematic perspective view of an example torso device as disclosed herein comprising shoulder straps.

FIG. 12 shows a torso device 10 as disclosed herein comprising the outside cover 90 and further comprising a pair of optional straps 120 connected thereto. In an example, the straps 120 may be formed from a suitable material useful for being placed or fitted over the shoulders of a user when using the torso device 10 to provide an additional degree of vertical support to the torso device. Suitable materials useful for forming the straps 120 include cloth materials, fabric materials, leather materials, plastic materials, polymeric materials, and the like. In an example, the straps 120 may be formed from a cloth or fabric material, such as a fabric or cloth belting. In an example, each strap 120 extends from an attachment point along the rear edge 66 of the rear member 20 over the top of elongate element 56 and to an attachment point 122 along the front edge of the front member 12. In an example, the attachment points 122 may be configured to permanently attached the straps 120 to the outside cover 90, e.g., by sewn connection and the like, or may be configured to releasably attach the straps 120 to the outside cover 90, e.g., by button connection, Velcro connection, and the like. In an example, each strap 120 may include a front portion 124 extending a length from the front member 12, and a rear portion 126 extending a length from the rear member 20. An attachment element 128 in the form of a buckle, male and female snap connection members, or the like may be attached to one or both ends of the strap front and rear portions 124 and 126 for purposes of forming releasable attachment between the strap front and rear portions 124 and 126 and/or enabling adjustment of the length of the strap 120 to provide an optional fitment when worn by the user. Configured in this matter, the straps 120 provide a desired degree of vertical support to the torso device when worn by a user. If desired, the straps 120 may be configured to accommodate placement of a cover (not shown) thereover, e.g., over a portion of the straps in front of the user to provide a degree of privacy to the user or the like. While a particular configuration of the straps 120 has been described and illustrated, it is to be understood that different configurations of straps may be developed to serve the same or similar purpose and that all such different strap configurations are intended to be included with the scope of torso devices as disclosed herein.

Figure 13:
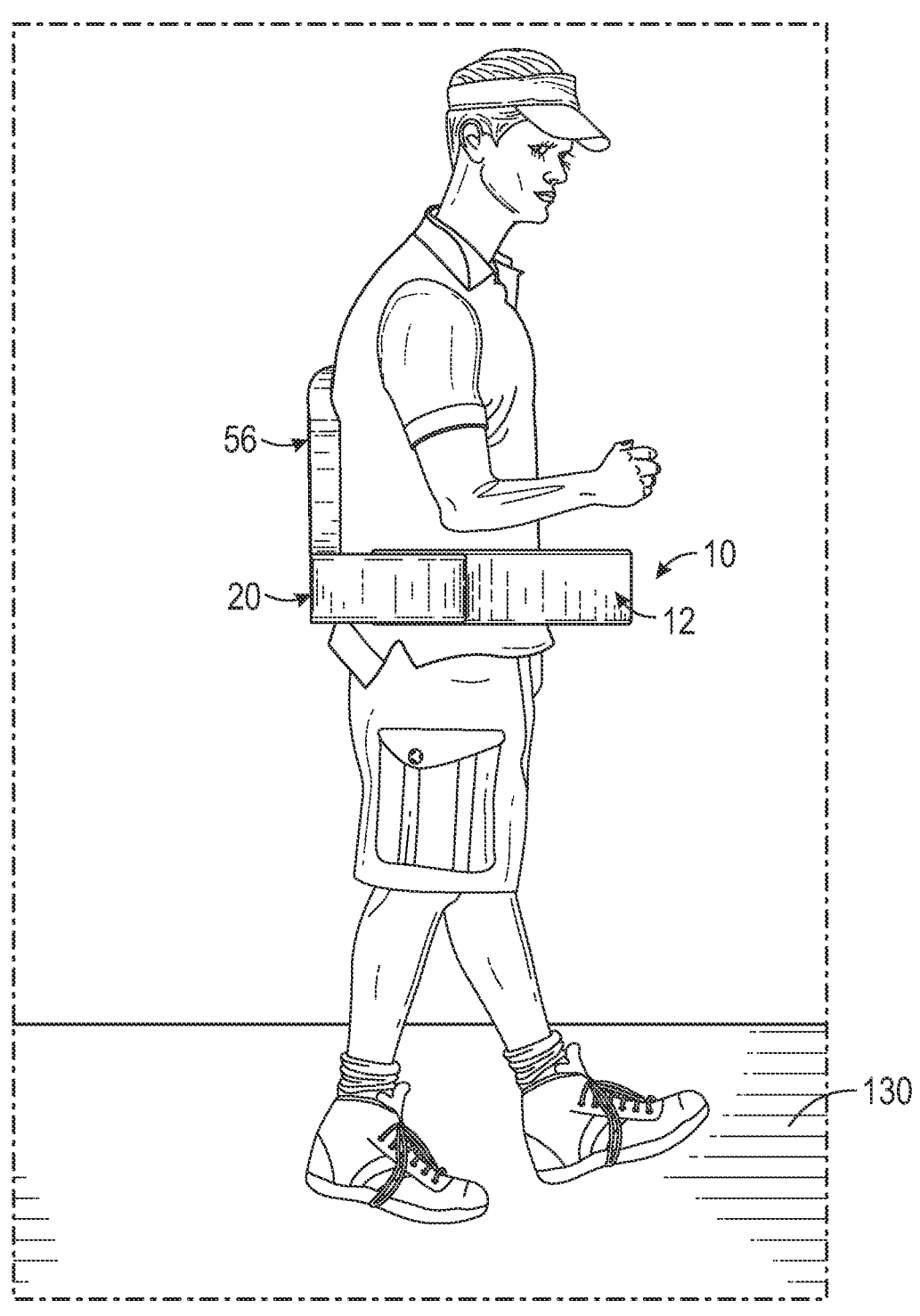
FIG. 13 is a schematic view showing use of the device by a user when in a walking position.
Figure 14:
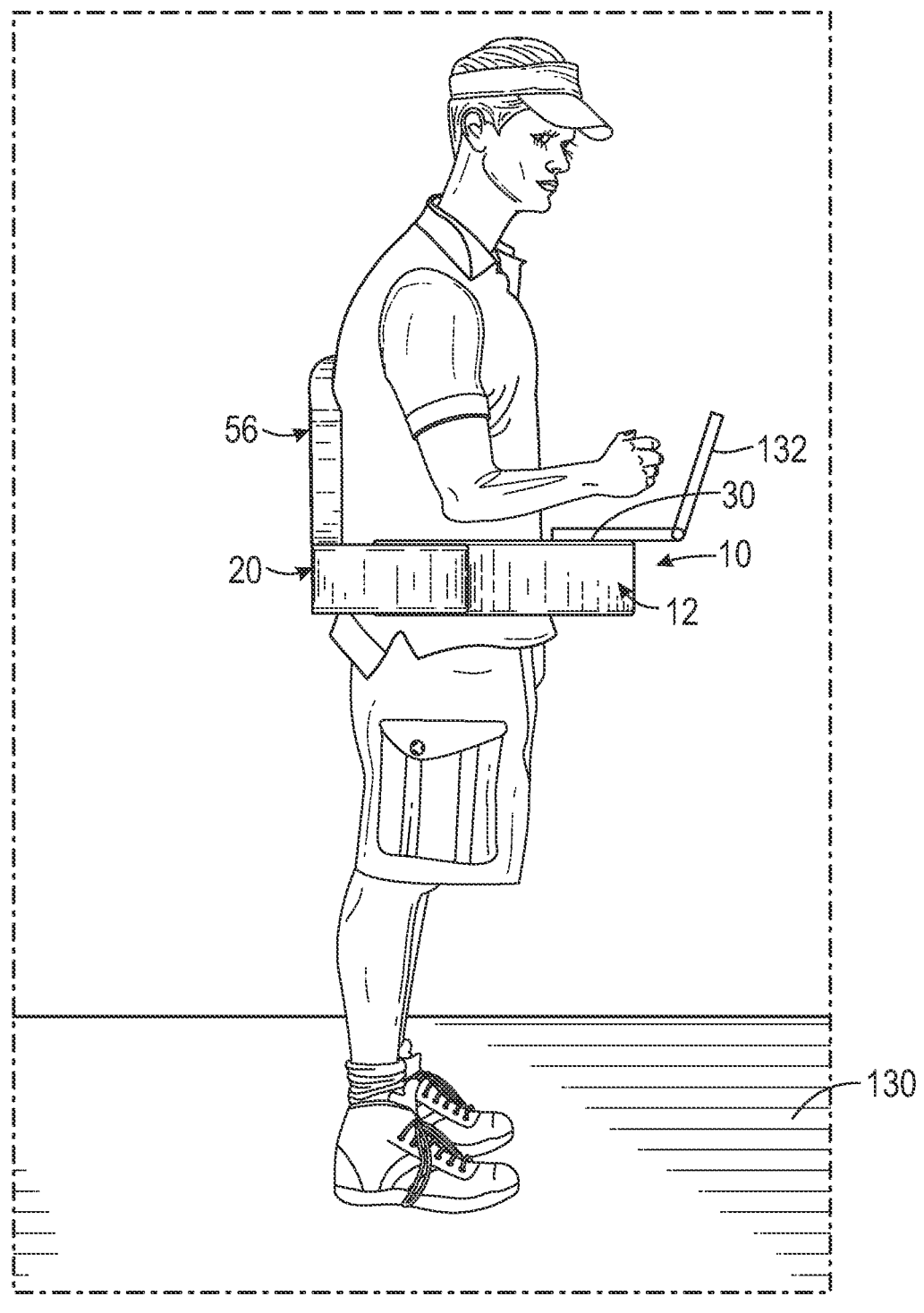
FIG. 14 is a schematic view showing use of the device by a user when in a standing position.

FIGS. 13 and 14 illustrate use of the torso device 10 by user. Specifically, FIG. 13 illustrates use of the torso device 10 by a user while walking and shows how the combination of surface area contact (provided by the front member 12, the rear member 20 and the elongate element 56, and compressions force imposed by the torso device (by the front member 12 and rear member 20) onto the user's torso operates to maintain a desired placement position of the torso device 10 on the user with the front member 12 extending substantially perpendicular to the user's torso or parallel with the floor 130 that the user is walking on. FIG. 14 illustrates use of the torso device 10 by a user while standing and shows how the combination of surface area contact (provided by the front member 12, the rear member 20 and the elongate element 56, and compressions force imposed by the torso device (by the front member 12 and rear member 20) onto the user's torso operates to maintain a desired placement position of the torso device 10 on the user with the front member 12 extending substantially perpendicular to the user's torso or parallel with the floor 130 that the user is standing on. In this example, the torso device 10 is being used to support a laptop computer 132 on the front member top surface 30.

Various embodiments of torso devices have been described with reference to the drawings. The descriptions are intended to be illustrative, not limitative of torso devices as disclosed herein. Thus, it will be apparent to one skilled in the art that certain modifications may be made to the torso devices as described without departing from the scope of the claims set out below.

The invention claimed is:

1. A torso device comprising:
   a body front member, a body rear member, and a central opening interposed between the body front member and the body rear member, at least a portion of the body front member and the body rear member being formed from one or more integral pieces of resilient material, the torso device further comprising a closed end disposed between the body front member and the body rear member and an open end disposed between the body front member and the body rear member opposite from the closed end, wherein the central opening is configured to accommodate placement of a user's torso therein by moving the body front member and the body rear member away from one another at the open end to enable user entry into the central opening, wherein the torso device is configured to impose a compression force against the user's torso when the user's torso is placed in the central opening, wherein the body front member and the body rear member comprises a first resilient material and a second resilient material, the first resilient material differing from the second resilient material, the first resilient material being disposed underneath the second resilient material;

wherein the first resilient material has a density from about 10 to 30 kg/m$^3$ and a Shore A hardness from about 30 to 100 to thereby provide an increased degree of stiffness and rigidity as compared with the second resilient material, and the second resilient material has a density from about 5 to 25 kg/m$^3$ and a Shore A hardness from about 15 to 50.

2. The torso device as recited in claim 1, wherein the body rear member comprises an elongate element that extends upwardly from the second resilient material, the elongate element providing an increased surface area of contact against a back portion of the user's torso and operates to resist downward movement of the body front member of the torso device relative to the user's torso inside of the central opening.

3. The torso device as recited in claim 2, wherein the elongate element is formed from a third resilient material that differs in density from the first and second resilient materials.

4. The torso device as recited in claim 3, wherein the first resilient material comprises a larger volume of material as compared with the second resilient material.

5. The torso device as recited in claim 4, wherein the first resilient material comprises a greater thickness of material as compared with the second resilient material.

6. The torso device as recited in claim 1, wherein the body front member and the body rear member have surface areas that contact adjacent portions of the user's torso when the user's torso is placed in the central opening, and wherein the combination of surface area contact and compression force function to maintain a placement position of the torso device relative to the user's torso when the user moves from a sitting position to a standing position, wherein the placement position is maintained without any additional support from the user's hands or arms, and wherein when in the placement position the body front member extends substantially perpendicular to the user's torso and/or substantially parallel to a floor on which the user is standing or walking.

7. A torso device comprising:
a front member having a top surface, a bottom surface, a side element, and a rear edge, wherein the front member comprises a first resilient material that extends from the bottom surface of the front member towards an interior section of the front member and a second resilient material that extends from the interior section of the front member towards the top surface of the front member, wherein the first resilient material has a density from about 10 to 30 kg/m$^3$ and a Shore A hardness from about 30 to 100 to thereby provide an increased degree of stiffness and rigidity as compared with the second resilient material, and the second resilient material has a density from about 5 to 25 kg/m$^3$ and a Shore A hardness from about 15 to 50; and
a rear member formed integral with and extending from the front member along the side element, wherein the rear member includes a front edge that extends opposite the front member rear edge, the rear member comprising the first and second resilient materials;
wherein a center opening is defined between the front member rear edge, the front member side element, and the rear member front edge, wherein the front member rear edge and rear member front edge each have a surface area for contacting an adjacent portion of a torso of a user disposed in the center opening, wherein when the torso of the user is disposed in the center opening the torso device front and rear members surface areas contact the torso of the user and impose a compression force on the torso of the user that together operate to maintain a placement position of the torso device on the user such that the front member top surface remains substantially perpendicular to the torso of the user and/or remains substantially parallel to a floor on which the user is sitting or standing.

8. The torso device as recited in claim 7, wherein the compression force is greater than about 0.2 ft·lb.

9. The torso device as recited in claim 7, wherein the compression force is greater than about 0.4 ft·lb.

10. The torso device as recited in claim 7, further comprising an elongate element attached to the rear member and extending upwardly therefrom, the elongate element providing for an increased surface area of contact with a rear portion of the torso of the user to resist downward movement of the front member relative to the torso of the user.

11. The torso device as recited in claim 10, wherein the elongate element has a height as measured from a bottom surface of the rear member and a top surface of the elongate element that is at least 1.5 times a thickness of the front member as measured between the front member top surface and the front member bottom surface.

12. The torso device as recited in claim 11, wherein the first resilient material comprises a larger volume of material as compared with the second resilient material.

13. The torso device as recited in claim 12, wherein the rear member comprises the first resilient material and the second resilient material.

14. The torso device as recited in claim 13, wherein the first resilient material comprises 50 percent or more of a total thickness of the front and rear members and the second resilient material comprises 50 percent or less of the total thickness of the front and rear members.

15. The torso device as recited in claim 7, wherein the front member has a thickness that changes moving from a front edge to the rear edge.

16. The torso device as recited in claim 7, wherein the front member comprises a lip element that projects upwardly a distance from the top surface and that is positioned adjacent one or both of a front edge of the front member or the front member rear edge.

17. A torso device comprising:
a front member, the front member comprising a layer of a first resilient material and a layer of a second resilient material, the layer of the first resilient material being positioned underneath the layer of the second resilient material, the first resilient material differing in density from the second resilient material, wherein the first resilient material has a density from about 10 to 30 kg/m$^3$ and a Shore A hardness from about 30 to 100 and the second resilient material has a density from about 5 to 25 kg/m$^3$ and a Shore A hardness from about 15 to 50;

a rear member disposed opposite from the front member, the rear member comprising the layer of the first resilient material and the layer of the second resilient material, wherein a thickness for the layers of the first and second resilient materials in the rear member is similar to a thickness for the layers of the first and second resilient materials in the front member; and a first side element extending between and being integral with both the front member and the rear member, and a second side element extending from the rear member opposite the first side element, wherein the front member includes an end separate from the rear member and positioned adjacent the rear member when in a relaxed state, wherein an opening is defined between the front and rear members for accommodating placement of a torso of the user therein by placing the front and rear members into an energized state by moving the front member end away from the rear member, wherein the front and rear members have surface areas that contact adjacent portions of the torso of the user in the opening and impose a compression force on the torso of the user of greater than about 0.2 ft·lb.

18. The torso device as recited in claim 17, wherein in the relaxed state an entirety of the second side element extends along an outside surface of the front member.

19. The torso device as recited in claim 18, wherein the rear member further comprises an elongate element, the elongate element comprising a third resilient material that differs in density from the first and second resilient materials, wherein the elongate element adds additional surface area contact with a back portion of the torso of the user.

20. The torso device as recited in claim 19, wherein the front member comprises a majority of the first resilient material as compared with the second resilient material.

* * * * *